United States Patent [19]

Licata et al.

[11] Patent Number: 4,670,695

[45] Date of Patent: Jun. 2, 1987

[54] CONTROL FOR WINDSHIELD WIPERS WITH OVERLAPPING PATTERN AND PARK

[75] Inventors: Joseph P. Licata, Dayton, Ohio; Robert M. Sigler, Jr., Troy, Mich.

[73] Assignee: General Motors Corporation, Detroit, Mich.

[21] Appl. No.: 904,039

[22] Filed: Sep. 5, 1986

[51] Int. Cl.[4] .......................... H02P 1/04; B60S 1/08
[52] U.S. Cl. ..................................... 318/443; 318/41; 318/102; 318/444; 318/468; 318/DIG. 2; 15/250.12; 15/250.17
[58] Field of Search ....................... 318/41, 50, 53, 85, 318/102, 443, 444, 468, DIG. 2; 15/250.12, 250.17

[56] References Cited

U.S. PATENT DOCUMENTS

| | | | |
|---|---|---|---|
| 2,985,024 | 5/1961 | Contant et al. | 74/70 |
| 3,721,878 | 3/1973 | Gumbert | 318/443 |
| 4,405,887 | 9/1983 | Tamura et al. | 318/443 |
| 4,431,954 | 2/1984 | Carpenter et al. | 318/443 |

FOREIGN PATENT DOCUMENTS

| | | | |
|---|---|---|---|
| 2621370 | 1/1977 | Fed. Rep. of Germany | 318/443 |
| 2942739 | 5/1981 | Fed. Rep. of Germany | 15/250.12 |
| 1573900 | 8/1980 | United Kingdom | 318/443 |
| 2132793 | 7/1984 | United Kingdom | |

Primary Examiner—William M. Shoop, Jr.
Assistant Examiner—Bentsu Ro
Attorney, Agent, or Firm—Robert M. Sigler

[57] ABSTRACT

A control for an electrically powered, motor vehicle windshield wiper system with independent drive motors for the wiper blades which produces an opposing wiper pattern with overlapping park and which is simple and inexpensive to manufacture by providing a unique switching system which coordinates the blades to prevent interference therebetween and converts simply and effectively, when the system is turned off, to a blade parking control which allows continuation of normal blade movement into a predetermined park position. The control provides switch control for the motor of each wiper blade in response to certain predetermined positions of the other blade, including, in particular, a position adjacent but outside the wipe pattern of the other blade wherein the controlled blade may be stopped if necessary to avoid interference. The switching arrangement further utilizes contact segments which are switched into different switching arrangements by control switch apparatus in order to control normal running and parking in the most efficient manner.

5 Claims, 8 Drawing Figures 4,670,695

1

CONTROL FOR WINDSHIELD WIPERS WITH OVERLAPPING PATTERN AND PARK

BACKGROUND OF THE INVENTION

This invention relates to controls for electrically powered windshield wiper systems for use on motor vehicles and particularly for such systems in which the wiper blades have partially overlapping patterns and a symmetrical overlap park position. In addition, it relates to such systems using separate motors for the wiper blades with consequent need for coordinating such motors to prevent interference between the wiper blades in operation and parking.

The prior art shows a number of windshield wiper controls which control separate wiper motors. The Gumbert U.S. Pat. No. 3,721,878, issued Mar. 20, 1973 shows such a system with a switching arrangement in which each wiper motor is powered only during a certain angular range of the other wiper blade. However, in the Gumbert system, the blades are parked at the sides of the windshield in the outer wipe positions; and, after one starts by moving across the windshield toward the other, they move in a tandem pattern until the system is turned off, at which time they move back to the side park positions again. The Gumbert system does not teach how to control an opposing wipe with partial overlap and an overlap park position at the bottom of the windshield.

An additional prior art system is that shown in UK patent application GB No. 2 132 793, published July 11, 1984. In this system, wipers in a standard tandem pattern with standard park position but with separate drive motors are coordinated through a switching arrangement whereby each wiper must proceed to a predetermined angle in order that the other be driven through a predetermined angle, the angles being so arranged to prevent blade interference. A similar arrangement is suggested in a digital computer embodiment, although not described in detail, in column 10, lines 29-41 of the Carpenter et al U.S. Pat. No. 4,431,954, issued Feb. 4, 1984 (filed Nov. 26, 1982). The Carpenter et al patent shows a storm pattern for a dual motor wiper system which otherwise produces a standard tandem pattern with overlapping park. In the storm pattern, the driver's side blade stops at outerwipe to allow the other blade to descend to the bottom of the windshield and back and thus provide wiping of an area in front of the driver four times in each complete cycle rather than the normal two times. However, neither the UK application nor Carpenter et al show a control for an opposing, overlapping wiper pattern.

SUMMARY OF THE INVENTION

It is the object of this invention to provide a control for an electrically powered, motor vehicle windshield wiper system with independent drive motors for the wiper blades which produces an opposing wiper pattern with overlapping park and which is simple and inexpensive to manufacture by providing a unique switching system which coordinates the blades to prevent interference therebetween and converts simply and effectively, when the system is turned off, to a blade parking control which allows continuation of normal blade movement into a predetermined park position. Such a control provides switch control for the motor of each wiper blade in response to certain predetermined positions of the other blade, including, in particular, a position adjacent but outside the wipe pattern of the other blade wherein the controlled blade may be stopped if necessary to avoid interference. The switching arrangement further utilizes contact segments which are switched into different switching arrangements by control switch apparatus in order to control normal running and parking in the most efficient manner. The invention itself is defined in the claims at the end of this specification, interpreted in light of the remainder of the specification.

Further details and advantages of this invention will be apparent from the accompanying drawings and following description of a preferred embodiment.

DESCRIPTION OF A PREFERRED EMBODIMENT

Figure 2A:
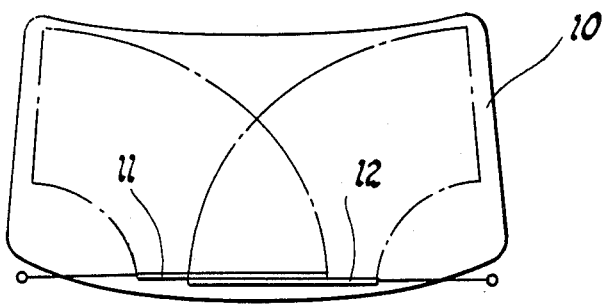
FIGS. 2(a)–2(g) are plan drawings of the windshield and wiper blades to be controlled by the control of FIG. 1 in which the patterns and predefined blade positions are identified and in which the progression of the patterns is shown.
Figure 2B:
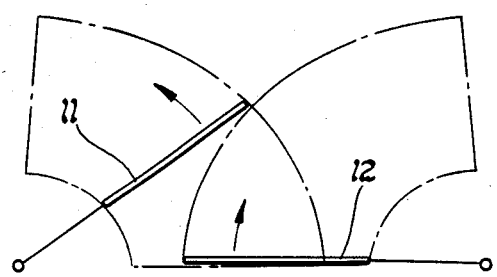
Figure 2C:
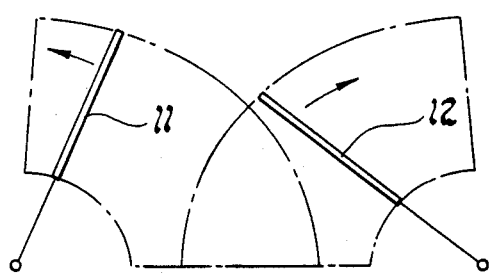
Figure 2D:
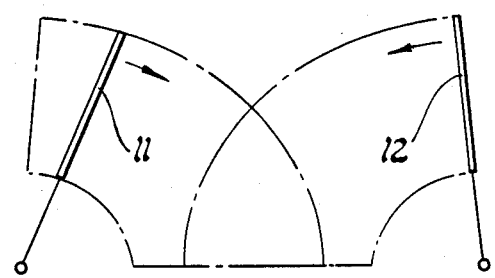
Figure 2E:
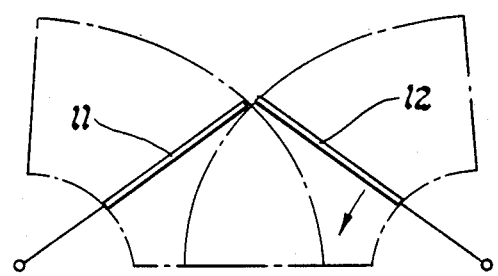
Figure 2F:
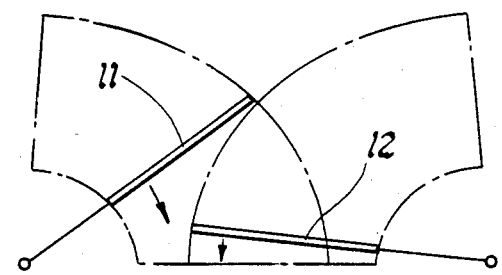
Figure 2G:
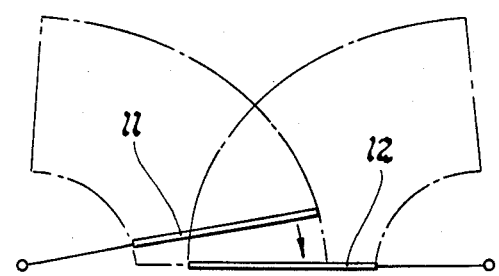

Referring to FIG. 2(a), a windshield 10 of a motor vehicle is shown with a first wiper blade 11 and a second wiper blade 12 in a symmetrical overlap park position at the bottom of the windshield. The remainder of the vehicle is not shown, but is understood to be conventional. The wiper blades 11 and 12 are to be driven in an opposing pattern from the overlapping park position shown to outerwipe positions at the sides of the windshield and back in a repeating, partially overlapping pattern, as shown in the remaining FIGS. 2(b)–2(g), which will be used for illustration at later points in this specification.

Figure 1:
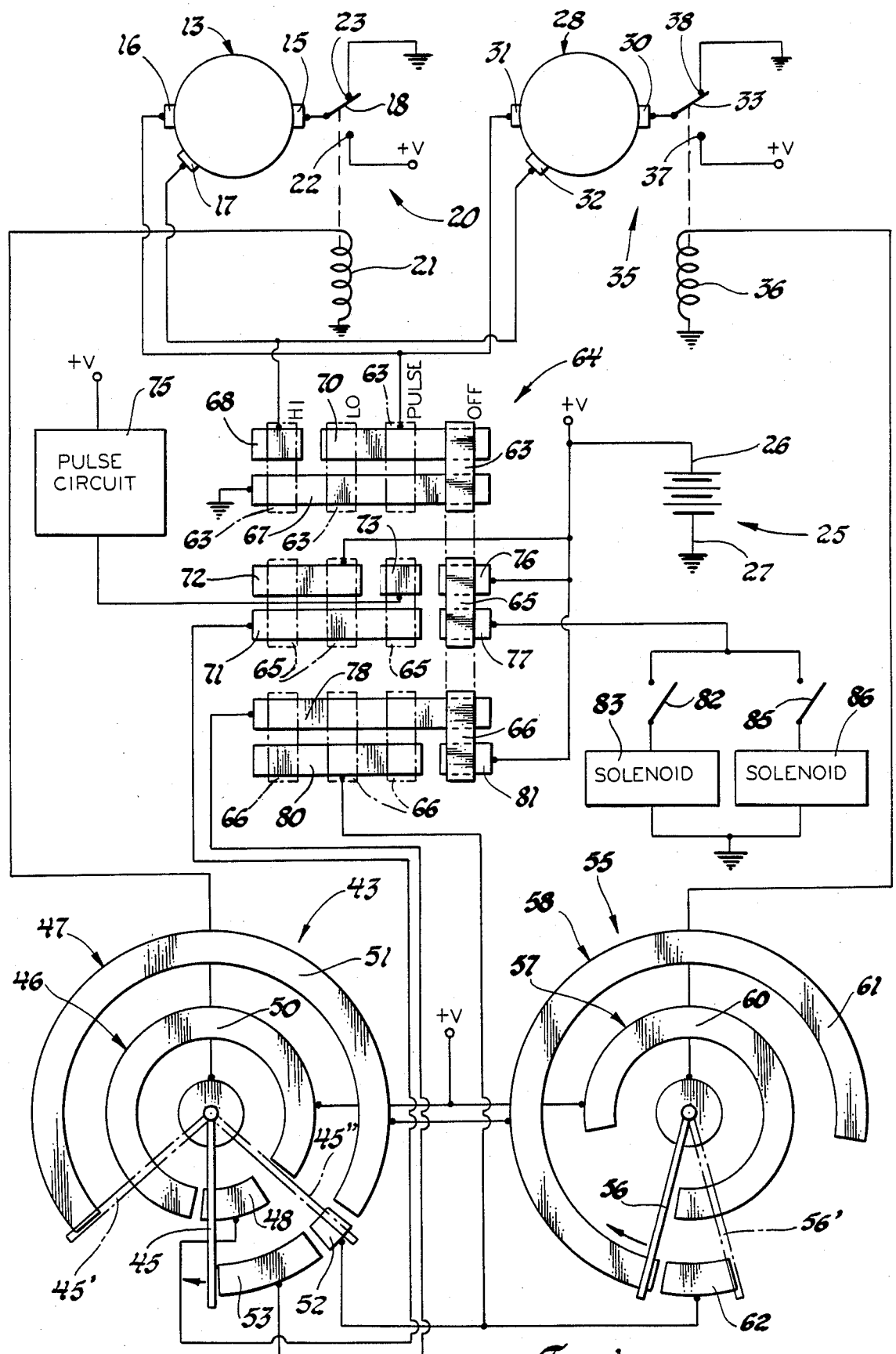
FIG. 1 is a schematic and block diagram of an embodiment of the control of this invention.

Referring to FIG. 1, first wiper motor 13 is preferably a three brush, DC, permanent magnet motor with a common armature terminal 15, a low speed terminal 16 and a high speed terminal 17. Motor 13 is adapted to drive first wiper blade 11 through a standard reversing mechanical linkage of the type which converts rotating to reciprocating motion. Motor 13 runs in only one direction as it drives blade 11 through its pattern. The linkage is not shown, being of any standard construction well known in the windshield wiper art; but it should include at least one rotating member which makes a single revolution for each complete cycle of the pattern of blade 11.

An armature 18 of a relay 20 is connected to the common armature terminal 15 of motor 13. Relay 20 includes an actuating coil 21, a normally open contact 22 and a normally closed contact 23. A DC power source 25 includes a +V terminal 26, at which a positive voltage +V is available, and a ground terminal 27. The normally open contact 22 of relay 20 is connected to the +V terminal 26 of DC power source 25; and the normally closed contact 23 is connected to ground terminal 27 of DC power source 25.

A second wiper motor 28 similar to motor 13 is adapted to drive second wiper blade 12 in a similar manner and includes a common armature terminal 30, a low speed armature terminal 31 and a high speed armature terminal 32. Common armature terminal 30 is connected to the armature 33 of a relay 35 including an actuating coil 36, a normally open contact 37 connected to +V terminal 26 of DC power source 25 and a normally closed contact 38 connected to ground terminal 27 of DC power source 25.

Before the switching arrangement for motors 13 and 28 is described, it will be helpful to describe the desired wiper patterns and, in so doing define certain predetermined wiper blade positions for the pattern of each wiper. Essentially, blade 11 defines, in one full cycle, a down pause position, an up clear position and, in the non-depressed park (NOP) version shown, a park position. In a depressed park version, the park position would be defined by an element of the blade linkage rather than the blade itself for purposes of this invention, since the relationship of blade to linkage is changed when parking in a depressed park position, and it is the linkage member which rotates once for each blade cycle which remains in a constant relationship to the motor and rotary switch means to be described. Blade 12 defines an up pause position and a down clear position, with the up pause position serving as the park position in the (NDP) version. In a depressed park version, the relationship of blade to linkage changes; and the depressed park position is defined by the linkage rather than the blade itself. Each blade will stop in its respective pause position, if the other blade has not reached its clear position, and remain until the clear position is reached by the other blade. The pause position for each blade is just outside and adjacent the wipe pattern of the other blade.

FIGS. 2(*a*)-2(*g*) show progressive positions of a non-depressed park (NDP) embodiment of the wiper. Beginning with FIG. 2(*a*), blades 11 and 12 are shown in an NDP symmetrical overlap park condition in their inner wipe positions. The position of blade 12 in FIG. 2(*a*) further defines an up pause position for blade 12 which is just below and adjacent the wipe pattern of blade 11. Blade 12 pauses in this position at the start of wiper operation and during each complete cycle thereafter while waiting for the other wiper to move to an up clear position, to be described below, and also parks in this position in the NDP embodiment. From FIG. 2(*a*) to 2(*b*), blade 11 first rises to the up clear position shown for it in FIG. 2(*b*), which is adjacent but just outside the wiper pattern for wiper 12. At this point blade 12 is permitted to rise. Thus, in FIG. 2(*b*), both blades are rising on the glass, with no possibility of interference. They continue to rise through the positions shown in FIG. 2(*c*); and blade 11 will normally first reach its outer wipe position and reverse to downward movement. In FIG. 2(*d*), blade 12 has just reached its outer wipe position and reversed to downward movement, while blade 11 is partly down the glass already. Since each wiper is moving separately in this region, they will not necessarily move at the same or predicted speeds and will not necessarily be in the exact relative positions shown.

The blades then move to the positions of FIG. 2(*e*), in which a down pause position is defined by blade 11 while blade 12 is continuing its downward movement. The down pause position of blade 11 is just outside and adjacent the wipe pattern of blade 12. It may be noted that the down pause position of blade 11 shown in FIG. 2(*e*) and the up clear position of blade 11 shown in FIG. 2(*b*) may be, but do not necessarily have to be, identical. If they are identical, of course there is still the difference that blade 11 is moving in different directions when it reaches the positions and only stops in one of them.

FIG. 2(*f*) shows the blades with blade 12 defining its down clear position, in which blade 11 is once again enabled for downward movement. It is not essential that the down clear position of blade 12 be outside the wipe pattern of blade 11, although it may be. In FIG. 2(*g*), blade 12 has completed a full cycle and is once again stopped in its up pause position, which may correspond to its lowest or inner wipe position, while blade 11 is shown moving downward to its lowest or inner wipe position as indicated in FIG. 2(*a*). If the wipers are turned off, they will come to rest, in the NDP version of the apparatus, in the positions of FIG. 2(*a*); whereas, if they are still turned on, they will proceed with another cycle from the position of FIG. 2(*a*), as will be described below.

Referring once again to FIG. 1, the rotary switch means will be described. First rotary switch means 43 comprises a first bridging contact member 45 shown in its park angle and in shadow with reference numerals 45′ and 45″ in angles corresponding to the up clear and down pause positions, respectively, of blade 11. Rotary switch means 43 further comprises a first or inner arcuate contact assembly 46 and second or outer arcuate contact assembly 47. Contact assembly 46 comprises a first contact member 48 extending in an arcuate manner from some angle after, in the direction of rotation of first bridging contact member 45, that corresponding to the down pause postion of wiper blade 11 to an angle after the park angle. That is, the first bridging contact member 45, in its rotation, encounters the beginning of first contact member 48 sometime soon after blade 11 leaves its down pause position and remains in contact therewith until blade 11 reaches an angle after the park angle shown in FIG. 1 and as indicated above.

The second contact member 50 of first arcuate contact assembly 46 extends in an arcuate manner from the angle after the park angle to an angle corresponding to just before the down pause position of blade 11. The separation of contact members 48 and 50 at the angle after the park angle is sufficiently close as to permit rotary inertia to carry the bridging contact from one to the other unpowered; but the angle is sufficiently after the park angle so that this does not occur during the parking operation when the system is turned off. In addition, the separation is wider at the down pause postion. In the latter case, it is important that the separation be wide enough to prevent such coasting from one contact member to the other.

In this application with its claims, a language convention is used to indicate relative separation of arcuate contact members. If the words "just before" and "just after" are used in reference to an angle or position, it means that the contact members approach to a small separation, but are sufficiently separated that the inertia of the rotating portion will not carry the bridging contact member from one contact member to the other and the apparatus is able to stop even if both contact members are powered. If two contact members are described as extending "from" and "to" an angle or position, it means that they are electrically separated but physically separated by such a small distance that rotational inertia is sufficient to carry the bridging contact from one onto the other. This also applies to two contact members extending to or from an angle described in the same language. If the words "before" and "after" are used without the modifying word "just", the separation is complete and may be rather large.

Second arcuate contact assembly 47 comprises a third contact member 51 extending in an arcuate manner from an angle corresponding to the up clear position of blade 11 to an angle corresponding to before the down pause position of blade 11. Second arcuate contact assembly 47 further comprises a fourth contact member 52 extending in an arcuate manner from an angle corresponding to just before the down pause position of blade 11 to an angle corresponding to just after the down pause position of blade 11. Thus, bridging contact member 45 in its down pause position, as indicated by reference numeral 45'', falls directly on fourth contact member 52. Finally, second arcuate contact assembly 47 comprises a fifth contact member 53 extending in an arcuate manner from an angle corresponding to just after the down pause position of blade 11 to an angle just before the park angle. Contact members 52 and 53 are sufficiently close that rotational inertia will carry bridging contact member 45 from one to the other and, if they are electrically connected, they thus act as one contact member.

Second rotary switch means 55 comprises a second bridging contact member 56 shown in an angle corresponding to the up pause position of blade 12 and in shadow with reference numeral 56' in an angle corresponding to the down clear position of blade 12. It further comprises a third or inner arcuate contact assembly 57 and a fourth or outer arcuate contact assembly 58. Contact assembly 57 comprises a single sixth contact member 60 extending in an arcuate manner from an angle corresponding to after the up pause position of blade 12 to an angle corresponding to just before the up pause position of blade 12. Contact assembly 58 comprises a seventh contact member 61 extending in an arcuate manner from an angle corresponding to the up pause position of blade 12 to an angle corresponding to before the down clear position of blade 12 and an eighth contact member 62 extending from an angle corresponding to the down clear position of blade 12 to an angle corresponding to just before the up pause position of blade 12. It may be noted that, although the preferred embodiment shows stationary contact assemblies and rotating bridging contact members, only relative rotation is required. It makes no difference whether the contact assemblies or the bridging contact assemblies rotate. An alternate embodiment might also place the contact assemblies on rotating drums with the bridging contacts on spring fingers biased against the drums.

Some of the elements of the first and second rotary switch assemblies are interconnected with each other and other circuitry as described below. Bridging contact members 45 and 56 are connected to ground through relay coils 21 and 36, respectively. Second contact member 50 and sixth contact member 60 are both connected to +V terminal 26 of battery 25; third contact member 51 is connected to seventh contact member 61; and fourth contact member 52 is connected to eighth contact member 62.

A control switch assembly 64 provides operator control of wiper function. Three sets of terminals are provided, with a set of contacts 63, 65 and 66 movable together as a unit under operator control. The first set of terminals comprises a grounded terminal 67 which is connected through contact 63 to a high speed terminal 68 in the HI position and to a low speed terminal 70 in the LO, PULSE and OFF positions. High speed terminal 68 is connected to the high speed brush terminals 17 and 32; while low speed terminal 70 is connected to the low speed brush terminals 16 and 31 of motors 13 and 28. This set of terminals provides control of motor speed, with high speed reserved for the HI speed position and low speed for all others, including the completion of the last wipe cycle in the OFF position.

A second set of terminals includes a terminal 71 connected to first contact member 48 and connectable through moving contact 65 in the HI and LO positions to a terminal 72 connected to the +V terminal 26 of battery 25. Thus, contact member 48 is energized in the HI and LO positions so that relay coil 21 is energized through the entire rotation of rotary switch apparatus 43 except for the down pause position. Terminal 71 is further connectible through moving contact 65 in the PULSE position to a terminal 73, which is connected through a pulse circuit 75 to the +V terminal 26 of battery 25 for pulse operation. Finally, in the OFF position, a terminal 76 connected to the +V terminal 26 of battery 25 is connected by moving contact 65 to a terminal 77, which is applicable only to a depressed park version of the wiper system and will be described below in connection with a modification for such a system. Neither of terminals 76 and 77 need be connected to anything for the NDP version currently being described.

The third set of terminals includes a terminal 78 connected to fifth contact member 53, a terminal 80 connected to fourth contact member 52 and eighth contact member 62 and a terminal 81 connected to the +V terminal 26 of battery 25. Moving contact 66 connects terminals 78 and 80 in the HI, LO and PULSE positions to interconnect contact members 53 and 52 (contact members 52 and 62 are always connected). Thus contact members 52 and 53 essentially act as one during all operating positions of the control switch means except the OFF position. In the OFF position, terminal 78 is connected by moving contact 66 to terminal 81, so that contact member 53 is powered and disconnected from contact member 52.

In operation, the system begins with the control switch apparatus in the OFF position, the bridging contact members 45 and 56 as shown in their solid line positions and blades 11 and 12 parked as shown in FIG. 2(a). Movement of the control switch means to its LO position causes contact member 48 to be powered and contact members 52 and 53 to be interconnected. Relay coil 21 is actuated to power motor 13 so that blade 11 rises on the glass and bridging contact member 45 rotates clockwise. When bridging contact member 45 passes its up clear position, it powers relay coil 36 through contact members 51 and 61. Motor 28 begins operating to drive blade 12 upward and cause bridging contact member 56 to rotate in the clockwise direction. When bridging contact member 45 reaches its down pause position, it loses power by separating from contact member 50; and relay coil 21 is deenergized to stop motor 13 quickly with dynamic braking. When bridging contact member 56 reaches its down clear position, it provides power again to relay coil 21 through contact members 62, 52 and 53 interconnected through contact 66 in the control switch means. Bridging contact member 45 is thus rotated onto the powered contact 48 once again to repeat its cycle. Meanwhile, bridging contact member 56 reaches its up pause position to stop and repeat its cycle. The operation is similar for HI and PULSE operation, with the obvious modifications.

When the control switch is moved to its OFF position, contact member 48 loses its power. Relay coil 36 will be powered through bridging contact member 56 and contact member 60 to drive blade 12 all the way to its up pause (park) position. Bridging contact member 45 will stop in the down pause position and will be started again when bridging contact member 56 reaches the down clear position. However, bridging contact member 56 may, and probably will, reach the park position before bridging contact member 45 reaches its park position. In this case, relay coil 21 would be deenergized and motor 13 would stop blade 11 short of its park position if the circuit were not modified. In order to ensure that motor 13 is powered to move blade 11 into its park position, contact member 53 is disconnected from contact member 52 and provided with power through moving contact 66 of the control switch assembly. Thus, when when bridging contact member 45 reaches contact member 53, motor 13 is powered into the park position.

In a depressed park version of this system, park switches and solenoids are added for each motor, with park switch 82 and solenoid 83 associated with motor 13 and connected in series between terminal 77 and ground. Similarly, park switch 85 and solenoid 86 associated with motor 28 are connected in series between terminal 77 and ground. Each of park switches 82 and 85 is closed except when the respective wiper is in a defined depressed park position below its normal inner wipe position and thus out of the normal wipe pattern. The solenoids 83 and 86 are activated through terminal 77 in the OFF position and cause electromechanical apparatus, not shown but old in the art, to change the "throw" of the wiper linkage so that the blade descends more than usual into the depressed park position. An example of such apparatus is shown in the U.S. Pat. No. 2,985,024, issued on May 23, 1961 to Contant et al. In the depressed park system, as already mentioned, the rotary switch assemblies may be used essentially unmodified as shown and described herein, since the relationship of the blades to the linkages change during the park operation to define new park positions of the blades corresponding to the same park angles of the rotary switch means.

The embodiments of the invention in which an exclusive property or privilege is claimed are defined as follows:

1. A windshield wiper control for a vehicle including a windshield upon which first and second wiper blades are driven in an opposing wipe pattern by first and second wiper motors, respectively, the first and second wiper blades defining partially overlapping wipe areas on the windshield with the first wiper blade further defining down pause and up clear positions adjacent but outside the wipe area of the second wiper blade and the second wiper blade further defining down clear and up pause positions within the wipe area of the first wiper blade near the bottom of the windshield, the control comprising, in combination:

a first rotary switch means comprising a first bridging contact member and first and second arcuate contact assemblies, the first and second arcuate contact assemblies being fixed relative to each other and to the defined positions of the first wiper blade, the first bridging contact member and the first and second arcuate contact assemblies together being adapted for relative rotation in synchronism with movement of the first wiper blade, the first arcuate contact assembly comprising a first contact member extending from an angle corresponding to just after the down pause position of the first wiper blade to an angle after a park angle corresponding to a position of the first wiper blade at the bottom of the windshield and a second contact member extending from the angle after the park angle to an angle corresponding to just before the down pause position of the first wiper blade, the second arcuate contact assembly comprising a third contact member extending from an angle corresponding to the up clear position of the first wiper blade to an angle corresponding to before the down pause position of the first wiper blade, a fourth contact member extending from an angle corresponding to just before the down pause position of the first wiper blade to an angle corresponding to just after the down pause position of the first wiper blade and a fifth contact member extending from an angle corresponding to just after the down pause position of the first wiper blade to an angle corresponding to just before the park angle;

a second rotary switch means comprising a second bridging contact member and third and fourth arcuate contact assemblies, the third and fourth arcuate contact assemblies being fixed relative to each other and to the defined positions of the second wiper blade, the second bridging contact member and the third and fourth arcuate contact assemblies together being adapted for relative rotation in synchronism with movement of the second wiper blade, the third arcuate contact assembly comprising a sixth contact member extending from an angle corresponding to after the up pause position of the second wiper blade to an angle corresponding to just before the up pause position of the second wiper blade, the fourth arcuate contact assembly comprising a seventh contact member extending from an angle corresponding to the up pause position of the second wiper blade to an angle corresponding to before the down clear position of the second wiper blade and an eighth contact member extending from an angle corresponding to the down clear position of the second wiper blade to an angle corresponding to just before the up pause position of the second wiper blade;

first circuit elements connecting the third and seventh contact members;

second circuit elements connecting the fourth and eighth contact members;

third circuit elements connecting the second and sixth contact members to a DC power source;

control switch means having a run position and a stop position, the control switch means including elements effective in the run position to connect the first contact member to the DC power source, disconnect the fifth contact member from the DC power source and connect the fifth contact member to the fourth and eighth contact members, the control switch means further including elements effective in the stop position to disconnect the first contact member from the DC power source, disconnect the fifth contact member from the fourth and eighth contact members and connect the fifth contact member to the DC power source; and fourth circuit elements effective in response to the connection of the first contact member to the DC power source to activate the first wiper motor and thus drive the first wiper blade and further effective in response to the connection of the second contact member to the DC power source to activate the second wiper motor and thus drive the second wiper blade, whereby the first and second wiper blades are driven through partially overlapping wipe patterns without interference with the control switch means in the run position and are parked in a symmetrical overlap park arrangement at the bottom of the windshield with the control switch means in the stop position.

2. The windshield wiper control of claim 1 in which:
the first and second arcuate contact assemblies comprise concentric arcuate strips of electrically conducting material on a first planar surface;
the third and fourth arcuate contact assemblies comprise concentric arcuate strips of electrically conducting material on a second planar surface; and
the first and second bridging contact members rotate over the first and second planar surfaces, respectively.

3. The windshield wiper control of claim 1 in which the fourth circuit elements comprise:
a first relay having a relay coil connected in series with the first bridging contact member, an armature connected in series with the armature of the first wiper motor and a normally open contact connected in series with the DC power source; and
a second relay having a relay coil connected in series with the second bridging contact member, an armature connected in series with the armature of the second wiper motor and a normally open contact connected in series with the DC power source.

4. The windshield wiper control of claim 3 in which:
the DC power source has first and second terminals with all connections to the DC power source recited in claims 1 and 3 being to the first terminal;
the first and second wiper motors each have a common armature terminal, a high speed armature terminal and a low speed armature terminal and the connections of the armature of the first and second relays are to the common armature terminals of the first and second wiper motors, respectively;
the control switch means has low and high speed run positions with the run position of claim 1 being the low speed run position and the control switch elements further being effective in the high speed run position to connect and disconnect as in the low speed run position;
the control switch means includes additional elements effective to connect the second terminal of the DC power source to the low speed armature terminals of the first and second wiper motors in the stop and low speed run positions and alternatively to the high speed armature terminals of the first and second wiper motors in the high speed run position; and
the normally closed contacts of the first and second relays are connected to the second terminal of the DC power source.

5. The windshield wiper control of claim 1 in which the control switch means includes additional elements effective, in the stop and run positions, to connect and disconnect, respectively, the DC power source to a terminal adapted for connection to depressed park apparatus actuating means.

* * * * *